Patented Aug. 12, 1924.

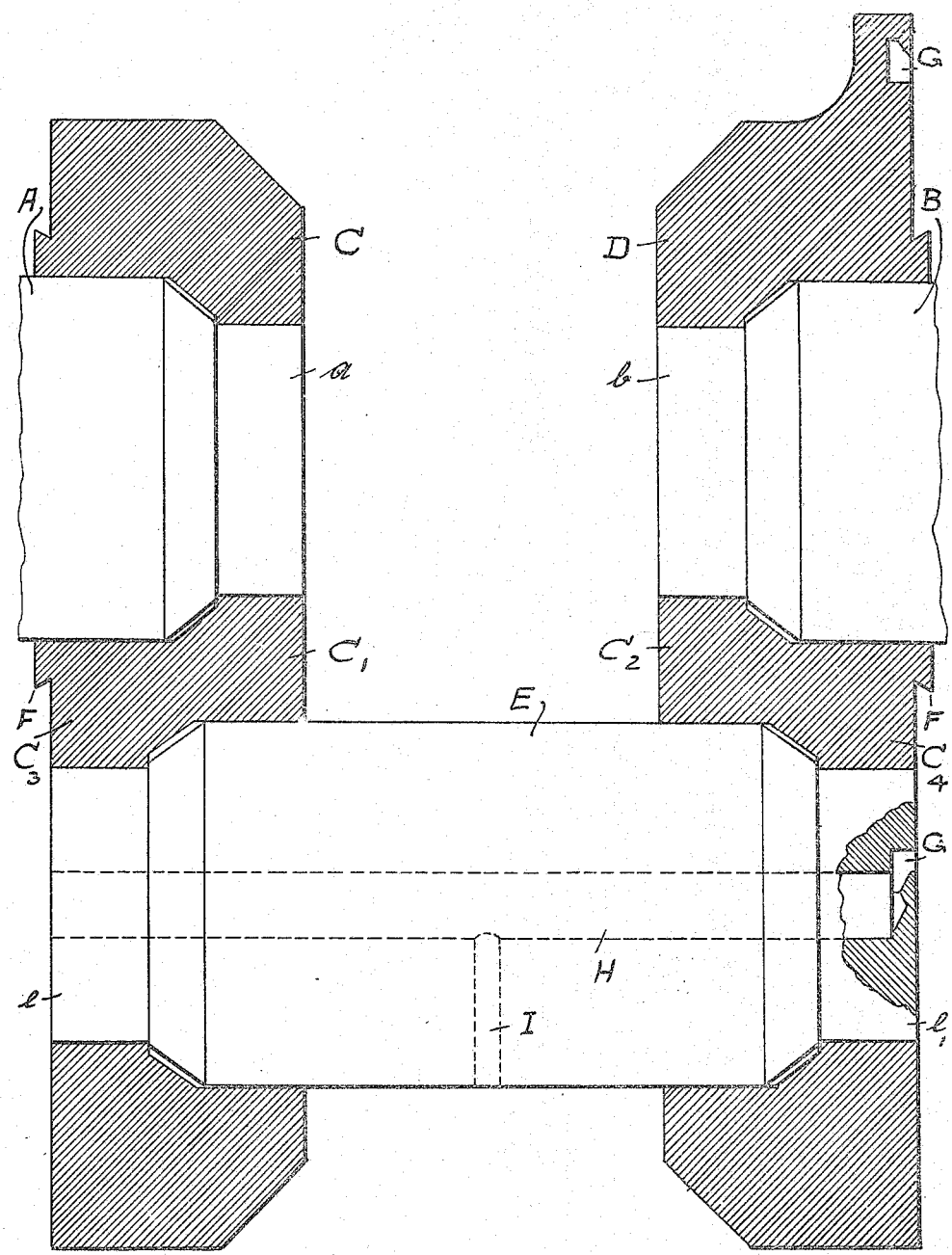

1,504,238

UNITED STATES PATENT OFFICE.

REINHARD HILDEBRAND, OF WEBSTER GROVES, MISSOURI, ASSIGNOR TO FULTON IRON WORKS COMPANY, OF ST. LOUIS, MISSOURI, A CORPORATION OF DELAWARE.

CRANK SHAFT.

Application filed December 30, 1920. Serial No. 434,175.

*To all whom it may concern:*

Be it known that I, REINHARD HILDEBRAND, a citizen of Germany, and a resident of Webster Groves, in the county of St. Louis and State of Missouri, have invented a new and useful Crank Shaft, of which the following is a specification.

My invention relates to "built up" crank shafts and its object is to obtain a better and stronger shaft than used heretofore.

The drawing shows my invention, embodied in a crank shaft. The shaft proper is designated by the letters "A" and "B", the crank arms are marked "C" and "D" and the crank pin is indicated by the letter "E". The shaft "A" and "B" and the pin "E" are pressed or shrunk into the crank arms "C" and "D".

It will be noticed that the ends of the shafts and the ends of the pin are stepped down to a smaller diameter. These reduced shaft ends and pin ends are designated by the letters "$a$" and "$b$" and by "$e$" and "$e_1$", respectively. The object of stepping down the shaft ends and pin ends is to reduce the corresponding apertures in the crank arms "C" and "D", thus obtaining a greater amount of material at the places $C_1$, $C_2$, $C_3$ and $C_4$ in the crank arms, compared with the design heretofore used which does not have reduced shaft and pin ends.

This increase of material in the crank arms at the places $C_1$, $C_2$, $C_3$, and $C_4$ is of great importance which will be understood if the manner of assembling a built up crank shaft is considered. For this reason the method of assembling a built up crank shaft shall be explained:

First, the pin "E" is pressed or shrunk into the crank arms "C" and "D". The holes for the shaft "A" and "B" which were previously rough bored into the crank arms "C" and "D" are now finished and the shaft "A" and "B" pressed or shrunk into the arms. This pressing or shrinking the shaft "A" and "B" into the crank arms "C" and "D" tends to stretch the material of the crank arms at the places $C_1$, $C_2$, $C_3$, and $C_4$, disturbing the press or shrink fit of the pin "E", causing the pin to become loose in the crank arms. Quite a number of failures of built up crank shafts are caused by insufficient crank arm material at the places $C_1$, $C_2$, $C_3$ and $C_4$. Now it will be fully understood that the strength of my built up crank shaft is increased by decreasing the diameters of the shaft ends and pin ends, thus, decreasing their corresponding apertures in the crank arms.

Each shaft member A and B is provided with a tapering shoulder and a reduced end portion extending therefrom, and the crank pin E is likewise provided with tapering shoulders and reduced end portions extending therefrom. Each crank arm is closely fitted to a shaft member and crank pin at points on opposite sides of the tapering shoulders, and these shoulders are surrounded by correspondingly tapered shoulders in the crank arm.

Referring again to the drawing, "F" represents oil slings which throw off the oil coming from the shaft bearings. The circular groove "G" the drilling "H" and "I" are provided to furnish oil to the crank pin, the oil being introduced into the groove "G".

Numerous changes could be made which would fall in the scope of my invention. In particular, I do not confine myself to built up center crank shafts, as end crank shafts can be made in a similar manner.

What I claim as new is:—

1. A crank arm provided with a stepped off aperture and a circular concentric oil groove around said aperture, and a passage from said oil groove leading to the bearing surface of the crank pin.

2. The combination of a shaft having a tapering shoulder, a relatively large straight portion at one side of said tapering shoulder and a reduced straight end portion extending from the other side of said tapering shoulder, a crank pin having a tapering shoulder, a relatively large straight portion at one side thereof and a reduced straight end portion extending from the other side, and a crank arm having apertures, each of which comprises a tapering wall portion, a relatively large straight wall portion at one side of said tapering wall portion, and a reduced straight wall portion extending from the other side of said tapering wall portion, the walls of said apertures being in contact with and closely fitted to the respective straight portions of the shaft and crank pin.

REINHARD HILDEBRAND.

Witnesses:
CHAS. P. GLAESE, Jr.,
WALTER A. GANTNER.